R. R. DEBACHER.
COMBINED POWDER BOX AND MIRROR.
APPLICATION FILED DEC. 5, 1911.
1,055,616.
Patented Mar. 11, 1913.
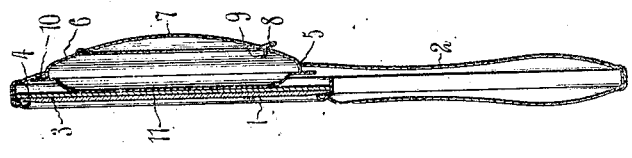
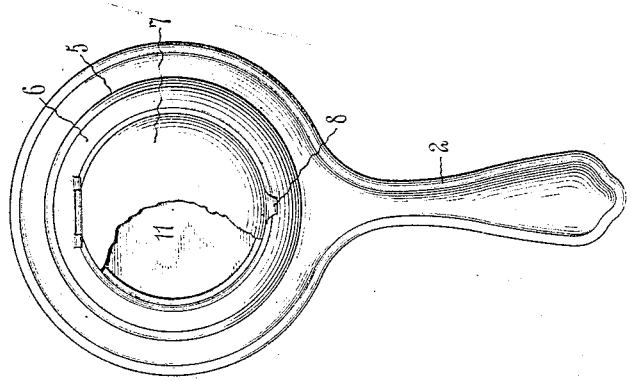
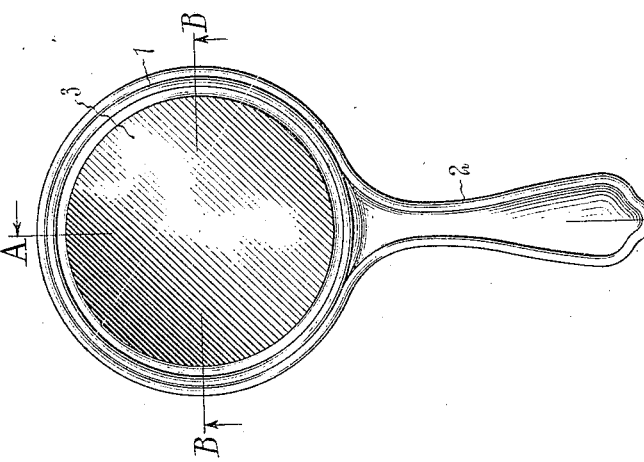
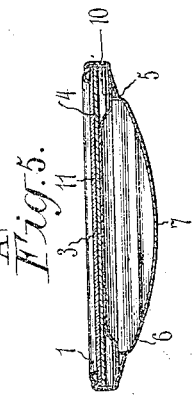
Witnesses:
Harry J. Fleischer
F. George Barry.
Inventor:
Robert R. Debacher
by his attorneys

UNITED STATES PATENT OFFICE.

ROBERT R. DEBACHER, OF HOBOKEN, NEW JERSEY.

COMBINED POWDER-BOX AND MIRROR.

1,055,616.  Specification of Letters Patent.  Patented Mar. 11, 1913.

Application filed December 5, 1911. Serial No. 664,094.

*To all whom it may concern:*

Be it known that I, ROBERT R. DEBACHER, a citizen of the United States, and resident of Hoboken, in the county of Hudson and State of New Jersey, have invented a new and useful Combined Powder-Box and Mirror, of which the following is a specification.

My invention relates to a combined powder box and mirror, the object being to provide a toilet article which shall satisfy the two demands for a powder or puff box and a hand mirror in one.

In the accompanying drawings, Figure 1 is a face view of the mirror side of the box, Fig. 2 is an edge view of the same, Fig. 3 is a face or top plan view of the powder or puff box, Fig. 4 is a section in the plane of the line A—A of Fig. 1, and Fig. 5 is a section in the plane of the line B—B of Fig. 1.

The mirror frame is denoted by 1 and this is provided with a handle 2 for holding the mirror 3 set in the frame 1 in the desired position. The mirror 3 has within the frame 1 a back plate 4 for protecting it and the back of the frame 1 which is spaced from the back plate 4 is provided with an opening 5 and in this opening 5 there is seated a rim 6 having hinged thereto a cover 7, the latter being provided with a spring catch 8. The spring catch 8 is conveniently formed by bending a projecting lip on the cover 7 back underneath itself and then inwardly with a slight turn at the extreme end, as shown at 9, the inwardly projecting portion 9 being arranged to bear against the edge of the rim 6 while the projecting portion which is folded under itself serves as a handle under which the nail of the operator may be placed to exert outward pressure sufficient to overcome the frictional engagement of the part 9 with the edge of the rim 6 to open the cover 7. The rim 6 may be soldered to the wall of the opening 5 or may be secured thereto in any other well known or approved manner. The rim 6 and the cover 7 are preferably made concavo-convex in shape with their convex side directed outward to increase the capacity of the box.

The bottom of the box of which the rim 6 and cover 7 forms the top, is formed by a thin plate of material, the margin 10 of which projects under the back of the frame 1 and also under the edge of the rim 6 with which it makes close contact and the body portion 11 of the said bottom is arranged to rest against the back plate 4 of the mirror 3 giving an additional depth to the box corresponding to whatever the space may be which it is found desirable to provide in forming the frame 1.

In assembling the parts before the front part of the frame 1 which overlaps the margin of the mirror 3 is crimped over the edge of the mirror, the rim 6 of the box with the cover 7 hinged thereto is placed in position and soldered to the wall of the opening 5. The bottom 11 of the box is then placed in position with its rim 10 in engagement with the rim 6. The back plate 4 and mirror 3 are then placed in position with the back plate 4 pressing against the bottom 11 of the box and the front of the frame 1 is then crimped over the edge of the mirror to hold the parts in position.

The article is dainty and attractive in appearance, is very conveniently manipulated and occupies but little more space than the hand mirror alone would occupy.

What I claim is:—

1. A hand mirror frame provided with a back plate for the mirror and having the back of the frame provided with an opening, a box rim and cover forming a closure for said opening and a box bottom interposed between the said back plate and the box rim, the margin of the box bottom contacting with the said box rim whereby a receptacle is formed and the body of the box bottom being located in proximity to the back plate of the mirror.

2. A hand mirror frame provided with an opening in its back, a box rim with cover hinged thereto secured to the wall of the opening and forming a closure of the opening and a box bottom interposed between the mirror and the said box rim to complete the box.

In testimony, that I claim the foregoing as my invention, I have signed my name in presence of two witnesses, this second day of December 1911.

ROBERT R. DEBACHER.

Witnesses:
F. GEORGE BARRY,
HENRY C. THIEME.